US010104133B2

(12) United States Patent
Tregenza Dancer

(10) Patent No.: US 10,104,133 B2
(45) Date of Patent: Oct. 16, 2018

(54) DATA COMMUNICATIONS

(71) Applicant: METASWITCH NETWORKS LTD., Enfield (GB)

(72) Inventor: Colin Tregenza Dancer, Enfield (GB)

(73) Assignee: METASWITCH NETWORKS LTD., Enfield (GB)

( * ) Notice: Subject to any disclaimer, the term of this patent is extended or adjusted under 35 U.S.C. 154(b) by 158 days.

(21) Appl. No.: 15/246,077

(22) Filed: Aug. 24, 2016

(65) Prior Publication Data

US 2017/0063941 A1 Mar. 2, 2017

(30) Foreign Application Priority Data

Aug. 24, 2015 (GB) ...................................... 1514999

(51) Int. Cl.
*G06F 15/16* (2006.01)
*H04L 29/06* (2006.01)
*H04L 29/08* (2006.01)

(52) U.S. Cl.
CPC ...... *H04L 65/1069* (2013.01); *H04L 65/1059* (2013.01); *H04L 65/1083* (2013.01); *H04L 65/1086* (2013.01); *H04L 67/02* (2013.01)

(58) Field of Classification Search
CPC ............. H04L 65/1059; H04L 65/1069; H04L 65/1083; H04L 65/1086; H04L 67/02
See application file for complete search history.

(56) References Cited

U.S. PATENT DOCUMENTS

| 9,307,049 | B2 * | 4/2016 | Brandstatter | ....... H04L 65/1069 |
| 9,660,943 | B2 * | 5/2017 | Ben-Ezra | .............. H04L 51/043 |
| 9,794,201 | B2 * | 10/2017 | Ben-Ezra | .............. H04L 51/043 |
| 9,881,282 | B1 * | 1/2018 | Narayanaswamy | ........................ G06Q 10/1095 |
| 2009/0161843 | A1 * | 6/2009 | Sylvain | ............... H04L 65/1069 379/93.09 |
| 2009/0164645 | A1 * | 6/2009 | Sylvain | ............... H04L 65/1033 709/228 |
| 2011/0249079 | A1 | 10/2011 | Santamaria et al. | |
| 2014/0126708 | A1 | 5/2014 | Sayko | |
| 2015/0049157 | A1 | 2/2015 | Krishnamoorthy et al. | |
| 2015/0312179 | A1 * | 10/2015 | Ben-Ezra | .............. H04L 51/043 709/203 |
| 2015/0334136 | A1 * | 11/2015 | Gao | ...................... H04M 7/006 709/228 |

(Continued)

*Primary Examiner* — Davoud Zand
(74) *Attorney, Agent, or Firm* — EIP US LLP

(57) ABSTRACT

Measures for use in operating a subscriber device in a network. An audio call communication session is conducted between the subscriber device and an audio call client of a remote user device. The audio call communication session includes the transfer of audio data between the subscriber device and the audio call client of the remote user device. During the audio call communication session, transmittal, to a user interface associated with a user of the remote user device, of information associated with switching communication from the audio call client of the remote user device to a web browser client is caused. A real-time media data communication session is established between the subscriber device and the web browser client. Real-time media data is transferred between the subscriber device and the web browser client instead of audio data between the subscriber device and the audio call client of the remote user device.

20 Claims, 5 Drawing Sheets

(56) References Cited

U.S. PATENT DOCUMENTS

2015/0381666 A1* 12/2015 Rustogi .............. H04L 65/1006
370/352
2018/0013839 A1* 1/2018 Noldus ................ H04L 67/146

* cited by examiner

DATA COMMUNICATIONS

CROSS-REFERENCE TO RELATED APPLICATIONS

This application claims priority under 35 U.S.C. § 119(a) to UK patent application no. GB 1514999.0, filed on Aug. 24, 2015, the entire content of which is hereby incorporated by reference.

BACKGROUND OF THE INVENTION

Field of the Invention

The present disclosure relates to data communications. In particular, but not exclusively, the present disclosure relates to measures, including methods, systems and computer-readable storage mediums, for operating devices and network nodes in a network.

Description of the Related Technology

Technology has been available for video and high definition (HD) enabled phone calls for many years. However, general uptake has been limited due to the 1/n2 problem, where a feature can only be used if both parties have the same equipment, and if only a small fraction of people (1/n) have suitable equipment, then the chance of being able to use the feature on a random call is 1/n2.

Popular over-the-top (OTT) products (such as Skype™, Google Hangouts™, etc.) approach this problem by trying to maximize uptake and minimize n.

However, with the now ubiquitous availability of internet access, smart devices and media enabled browsers, it would be desirable to be able to use these facilities to enhance the experience of parties who would normally contact each other using traditional phone services. Specifically, such enhancements can be seamlessly integrated with the traditional access means, in particular in terms of access control and billing. In this fashion, a carrier who offers this functionality provides their subscribers with a much enhanced level of service, whilst maintaining a strong customer relationship (unlike OTT offerings, which by definition are decoupled from the carrier).

SUMMARY

According to embodiments of the present disclosure, there is a method of operating a subscriber device in a network, the method comprising: conducting an audio call communication session between the subscriber device and an audio call client of a remote user device, the audio call communication session comprising the transfer of audio data between the subscriber device and the audio call client of the remote user device; during the audio call communication session, causing transmittal, to a user interface associated with a user of the remote user device, of information associated with switching communication from the audio call client of the remote user device to a web browser client; in response to the transmittal, establishing a real-time media data communication session between the subscriber device and the web browser client; and transferring real-time media data between the subscriber device and the web browser client instead of audio data between the subscriber device and the audio call client of the remote user device.

According to embodiments of the present disclosure there is a system for use in operating a subscriber device in a network, the system comprising at least one memory including computer program code; and at least one processor in data communication with the at least one memory, wherein the at least one processor is configured to: conduct an audio call communication session between the subscriber device and an audio call client of a remote user device, the audio call communication session comprising the transfer of audio data between the subscriber device and the audio call client of the remote user device; during the audio call communication session, cause transmittal, to a user interface associated with a user of the remote user device, of information associated with switching communication from the audio call client of the remote user device to a web browser client; in response to the transmittal, establish a real-time media data communication session between the subscriber device and the web browser client; and transfer real-time media data between the subscriber device and the web browser client instead of audio data between the subscriber device and the audio call client of the remote user device.

According to embodiments of the present disclosure there is a non-transitory computer-readable storage medium comprising computer-executable instructions which, when executed by a processor, cause a computing device to perform a method of operating a subscriber device in a network, the method comprising: conducting an audio call communication session between the subscriber device and an audio call client of a remote user device, the audio call communication session comprising the transfer of audio data between the subscriber device and the audio call client of the remote user device; during the audio call communication session, causing transmittal, to a user interface associated with a user of the remote user device, of information associated with switching communication from the audio call client of the remote user device to a web browser client; in response to the transmittal, establishing a real-time media data communication session between the subscriber device and the web browser client; and transferring real-time media data between the subscriber device and the web browser client instead of audio data between the subscriber device and the audio call client of the remote user device.

Further features of embodiments will become apparent from the following description of preferred embodiments, given by way of example only, which is made with reference to the accompanying drawings.

DETAILED DESCRIPTION OF CERTAIN INVENTIVE EMBODIMENTS

Figure 1:
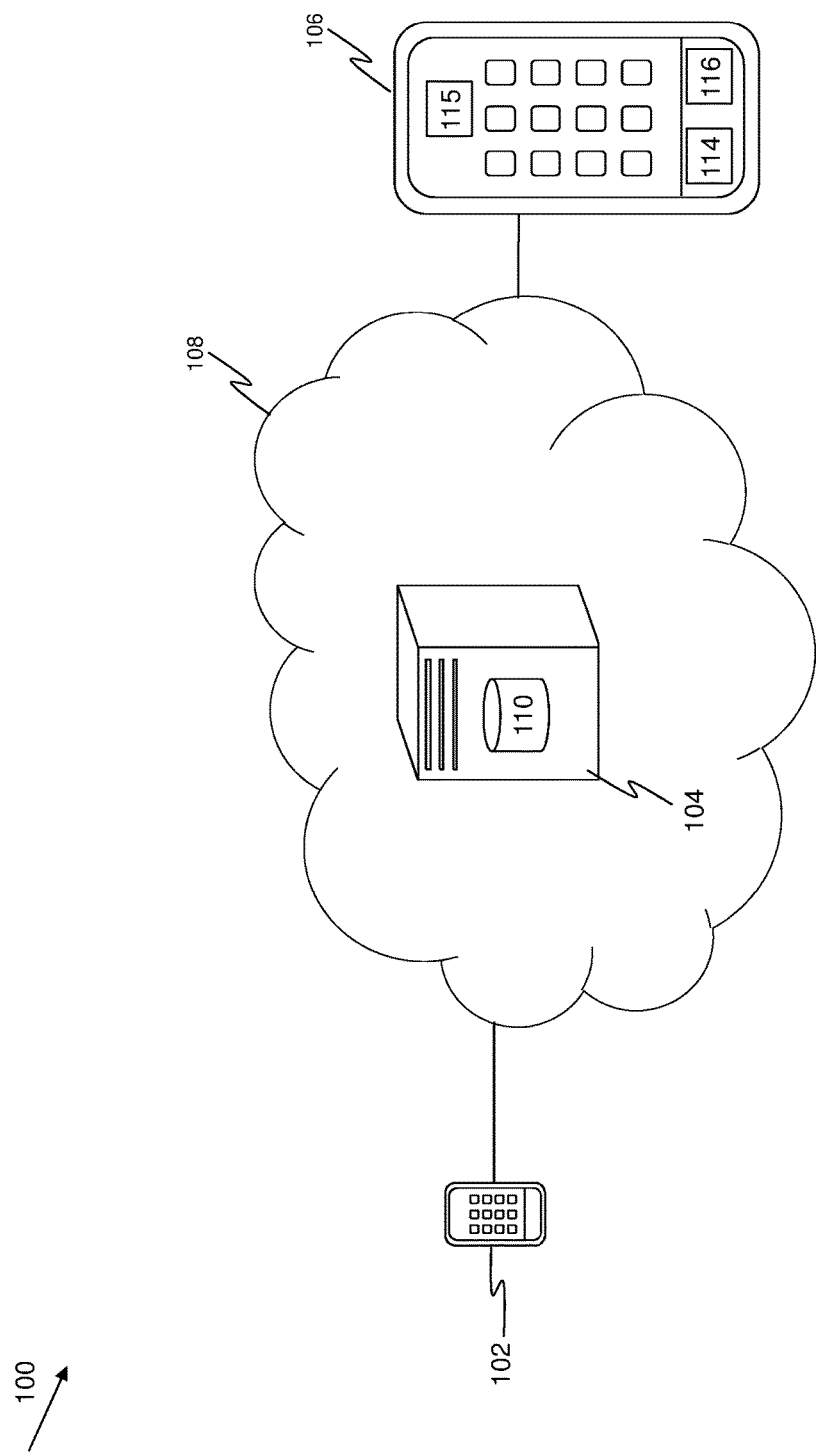
FIG. 1 shows a system diagram according to embodiments.

FIG. 1 shows a system diagram of a network 100 according to embodiments. Network 100 comprises a network part 108 which may for example comprise an Internet Protocol (IP) network part. Network 100 may comprise one or more gateway entities and/or one or more other network parts (not shown), for example mobile (or 'cellular') telephone network parts, Plain Old Telephone Service (POTS) network parts, etc.

Network part 108 comprises a network node 104 which is responsible for providing services such as data communication and/or telephony services, to a plurality of user devices. Network node 104 may for example comprise a server, gateway, proxy, softswitch, application server or other such network entity. Network node 104 comprises a processor (or 'processing system') (not shown) for performing various data processing tasks according to embodiments. Network node 104 comprises a memory and/or data store 110 for storing data. Network node 106 is capable of processing signaling information for audio/voice calls and/or communication sessions in network 100. Network node 104 is capable of communicating with data store 110, for example to store data therein or retrieve data therefrom. In embodiments, data store 110 is located locally to network node 104.

Network node 104 is also capable of communicating with a plurality of user (or 'subscriber') devices 102, 106 in network 100, for example via one or more wireless or wired communication links. In practice, network 100 could have a different number of user devices. The user devices can also be referred to as subscriber devices, endpoint devices, terminal devices, user agents, end devices, user equipment or endpoints.

Each user device comprises a processor (or 'processing system') (not shown) for performing various data processing tasks according to embodiments. Each user device comprises a memory and/or data store (not shown) for storing data. Each user device is capable of communicating with one or more network nodes such as network node 104 for example via one or more wireless or wired communication links.

In the embodiments of FIG. 1, user device 106 comprises an audio call client 114, a user interface 115 and a web browser client 116.

Audio call client 114 is capable of conducting audio call communication sessions between user device 106 and one or more remote user devices such as remote subscriber device 102. Such audio call communication sessions comprise the transfer of audio data between audio call client 114 and one or more remote user devices. In embodiments, audio call client 114 does not support (i.e. is not capable of) real-time transfer of media (or 'multimedia') data such as video data or HD audio data. In embodiments, audio call client 114 does support transfer of low-definition (or 'non-HD') audio/voice data.

User interface 115 allows a user associated with user device 106 to interact with user device 106, for example by providing user input via one or more hard keys, soft keys, a keyboard and/or a touch-screen. User interface 115 may for example comprise a capability to interface with one or more of an email client, a text messaging client, an instant messaging client and a multimedia messaging client on user device 106.

Web browser client 116 is capable of performing standard web-browser operations such as browsing the Internet. Web browser client 116 is also capable of conducting real-time media data communication sessions between web browser client 116 and one or more remote user devices such as remote subscriber device 102. Such real-time media data communication sessions comprise the transfer of media (or 'multimedia') data such as video data or HD audio data (which may comprise packet data) in real-time between web-browser client 116 and one or more remote user devices. Web browser client 116 comprises a browser-based real-time media communication capability such as web real-time communication (webRTC). In some embodiments, the real-time media communication capability is provided natively in the web browser client, whereas in other embodiments, the real-time media communication capability is provided as a plug-in to the web browser client.

In embodiments, the capabilities of web browser client 116 compared to audio call client 114 can be referred to as enhanced and non-enhanced or advanced and non-advanced (or 'basic') respectively.

Embodiments comprise measures, including methods, apparatus and computer programs, for use in operating a subscriber device 102 in network 100. An audio call communication session between subscriber device 102 and an audio call client 114 of user device 106 is conducted. User device 106 is located remote from subscriber device 102. The audio call communication session comprises the transfer of audio data between subscriber device 102 and the audio call client 114 of user device 106. During the audio call communication session, transmittal, to user interface 115 associated with a user of user device 106, of information associated with switching communication from audio call client 114 of user device 106 to web browser client 116 is caused. In response to the transmittal, a real-time media data communication session between subscriber device 102 and web browser client 116 is established. Real-time media data is transferred between subscriber device 102 and web browser client 116 instead of audio data between subscriber device 102 and audio call client 114 of user device 106.

Embodiments comprise measures, including methods, apparatus and computer programs, for use in operating a user device 106 in network 100. User device 106 comprises an audio call client 114. An audio call communication session between audio call client 114 of user device 106 and subscriber device 102 is conducted. User device 106 is located remote from subscriber device 102. The audio call communication session comprises the transfer of audio data between audio call client 114 and subscriber device 102. During the audio call communication session, user interface 115 associated with a user of user device 106 receives information associated with switching communication from audio call client 114 to web browser client 116. On the basis of the received information, web browser client 116 contacts network node 104 to establish a real-time media data communication session between web browser client 116 and subscriber device 102. Real-time media data is transferred between web browser client 116 and subscriber device 102 instead of audio data between audio call client 114 and subscriber device 102. In embodiments, user interface 115 passes the received information on to web browser client 116.

In embodiments depicted in FIG. 1, web browser client 116 is located on user device 106.

In embodiments, the transmitted information (the information transmitted to user interface 115 associated with a user of user device 106) comprises signaling information for use in establishing the real-time media data communication session between subscriber device 102 and web browser client 116.

In embodiments, the transmitted signaling information comprises one or more of logic and at least one script for execution by web browser client 116.

In some embodiments, the received information (the information received by user interface 115 associated with a user of user device 106) is received from subscriber device 102. In other embodiments, the received information is received from subscriber device 102 via one or more intermediate network nodes. In yet other embodiments, the received information is received from network node 104. In yet still other embodiments, the received information is received from a gateway node.

Embodiments comprise subscriber device 102 tearing down the audio call communication session. In embodiments, subscriber device 102 receives confirmation that a real-time media data communication session has been established between subscriber device 102 and web browser client 116; in such embodiments, the tearing down of the audio call communication session is carried out in response to receipt of the confirmation.

Embodiments comprise web browser client 116, in response to the contacting, receiving, signaling information for use in establishing the real-time media data communication session between web browser client 116 and subscriber device 102. In embodiments, the received signaling information comprises one or more of logic and at least one script for execution by web browser client 116. In some such embodiments, the received signaling information comprises a network address for a gateway node via which media data for the real-time media data communication session is to be transferred. In some embodiments, the gateway node comprises network node 104, whereas in other embodiments, the gateway node comprises a different node from network node 104. In embodiments, contacting the network node comprises contacting the network address of the gateway comprised in the received signaling information.

Embodiments comprise user device 106 tearing down the audio call communication session. Embodiments comprise user device 106 receiving confirmation that a real-time media data communication session has been established between web browser client 116 and subscriber device 102; in such embodiments, tearing down of the audio call communication session is carried out in response to receipt of the confirmation.

In embodiments, the transmitted information is encoded within a Uniform Resource Locator (URL).

In embodiments, the transmitted information comprises a network address for network node 104 via which establishment of the real-time media data communication session between subscriber device 102 and web browser client 116 is to be facilitated.

In embodiments, the transmitted information comprises a host name for network node 104 via which establishment of the real-time media data communication session between subscriber device 102 and web browser client 116 is to be facilitated.

In embodiments, the transmitted information comprises a URL associated with network node 104. In embodiments, contacting network node 104 comprises navigating to a URL associated with network node 104.

In embodiments, the transmitted information comprises an identifier for a webpage hosted by network node 104. In embodiments, contacting network node 104 comprises navigating to a webpage hosted by network node 104.

In embodiments, contacting network node 104 comprises performing a lookup (for example a domain name service (DNS) lookup) of a hostname of network node 104 to obtain a network address for network node 104.

In embodiments, at least part of the transmitted information is cryptographically secured.

In embodiments, the transmitted information comprises an identifier for a load balancing scheme implemented in relation to network node 104 and one or more other nodes (not shown) in network 100. In embodiments, contacting network node 104 comprises identifying network node 104 via a load balancing scheme implemented in relation to network node 104 and one or more other nodes in network 100.

In embodiments, the transmitted information comprises a secure token which comprises a cryptographically secure encoding of an identifier for subscriber device 102 and/or a user of subscriber device 102. In embodiments, contacting network node 104 comprises providing a secure token which comprises a cryptographically secure encoding of an identifier for subscriber device 102 and/or a user of subscriber device 102. The term 'token' refers to a string which encodes (for example cryptographically) one or more pieces of information.

In embodiments, the transmitted information comprises a secure token which comprises a cryptographically secure encoding of an identifier for the audio call communication session. In embodiments, contacting network node 104 comprises providing a secure token which comprises a cryptographically secure encoding of an identifier for the audio call communication session.

In some embodiments involving use of a token, when the token is generated, a password/phrase is specified which can then be presented when the token is used in order for the attempt to succeed. In some such embodiments involving use of a token, a federate identifier can be presented when the token is used.

In embodiments, the transmitted information comprises billing information for the audio call communication session.

In embodiments, the transmitted information comprises an expiry date for the transmitted information.

In some embodiments involving use of a token, one or more time limits may be attached to the token. In embodiments, a time limit for a given token is specified according to a default and/or a template, or by being explicitly specified.

In embodiments, web browser client 116 comprises a browser-based real-time media communication capability and the media data is transferred via the browser-based real-time media communication capability. The browser-based real-time media communication capability may for example comprise web real-time communication (webRTC).

In embodiments, the transferred real-time media data comprises one or more of video data and audio data in an enhanced format (for example HD audio) compared to the audio data transferred via audio call client 114 (for example non-HD audio).

Switching of communication from audio call client 114 to web-browser client 116 can also be referred to as 'uplifting', for example uplifting (a call, call leg, or communication session) from non-enhanced audio to enhanced audio or uplifting from audio only to video.

In embodiments, the transmitted information is transmitted via one or more of email, text message (such as Short Message Service (SMS)), instant message and multimedia message (such as multimedia messaging service (MMS)).

In embodiments, causing the transmittal of the information comprises generating the information at subscriber device 102 and transmitting the information from subscriber device 102 to user interface 115 associated with the user of user device 106.

In embodiments, causing the transmittal of the information comprises instructing a network node (for example network node 104 or a different network node from network node 104) to generate the information and transmit the generated information from the instructed network node to user interface 115 associated with the user of user device 106.

In embodiments causing the transmittal of the information comprises causing subscriber device 102 to follow a reference to a subscriber profile for a user of subscriber device 102 stored at a service provider node (for example network node 104 or a different network node from network node 104), retrieve the information from the subscriber profile, and transmit the information to user interface 115 associated with the user of user device 106.

In embodiments, receiving the information comprises user interface 115 associated with the user of user device 106 receiving a reference to a subscriber profile for the user of subscriber device 102 stored at a service provider node (for example network node 104 or a different network node from network node 104) and using the received reference to download the information from the service provider node.

In embodiments, causing the transmittal of the information comprises causing subscriber device 102 to provide, to user interface 115 associated with the user of user device 106, a reference to a subscriber profile for the user of subscriber device 102 stored at a service provider node (for example network node 104 or a different network node from network node 104); in such embodiments, user interface 115 associated with the user of user device 106 then uses the reference to the subscriber profile to cause the service provider node to transmit the information to user device 106.

In embodiments involving use of a token, instead of directly containing the information specified in the token, the relevant information is placed in a "call grant object" (CGO) held under the subscriber's account. In such embodiments, the token then references the CGO. This additional level of indirection allows increased control, including easy revocation of the request, additional constraints, or changing of parameters after the token has been passed to the remote party. Such functionality can be especially useful when embodiments are employed in relation to third party calling, third party authentication, conference calling or suchlike.

In some embodiments, one or more of the instructed node or the service provider node comprises network node 104 via which establishment of the real-time media data communication session between subscriber device 102 and web browser client 116 is to be facilitated. In other embodiments, one or more of the instructed node or the service provider node comprises a different network node from network node 104 via which establishment of the real-time media data communication session between subscriber device 102 and web browser client 116 is to be facilitated.

In embodiments, subscriber device 102 comprises a user interface. In such embodiments, the user interface is configured to present an option to the subscriber (the user of subscriber device 102) to switch communication from audio call client 114 of user device 106 to web browser client 116. In response to the configuring, user input is received via the user interface which indicates that the subscriber accepts the communication switch option; the real-time media data communication session is then established between subscriber device 102 and web browser client 116 in response to receipt of the user input. In embodiments, a similar procedure is mirrored via a user interface on user device 106.

Embodiments comprise subscriber device 102, receiving, from network node 104, an instruction to invoke a communication client on subscriber device 102 which is capable of transferring real-time media data with web browser client 116; in such embodiments, the real-time media data is transferred between the capable communication client of subscriber device 102 and web browser client 116.

In embodiments, the communication client on subscriber device 102 which is capable of transferring real-time media data with web browser client 116 is invoked in response to receipt of the user input indicating that the subscriber accepts the communication switch option.

In some embodiments, the real-time media data communication session established between web browser client 116 and subscriber device 102 comprises a first real-time media data communication session between subscriber device 102 and network node 104 and a second real-time media data communication session between web browser client 116 and network node 104. In other embodiments, the real-time media data communication session established between web browser client 116 and subscriber device 102 comprises a direct real-time media data communication session between subscriber device 102 and web browser client 116.

Embodiments comprise measures, including methods, apparatus and computer programs, for use in operating a network node 104 in network 100. During an audio call communication session being conducted between audio call client 114 of user device 106 and subscriber device 102, network node 104 receives from web browser client 116, information associated with switching communication from audio call client 114 to web browser client 116. The audio call communication session comprises the transfer of audio data between audio call client 114 of user device 106 and subscriber device 102. On the basis of the information received by network node 104 from web browser client 116, network node 104 contacts subscriber device 102 to facilitate establishment of a real-time media data communication session between web browser client 116 and subscriber device 102. Real-time media data is transferred between web browser client 116 and subscriber device 102 instead of audio data between audio call client 114 of user device 106 and subscriber device 102.

Embodiments comprise network node 104, in response to receipt of the information from web browser client 116, performing a validity check on at least a part of the received information to determine whether switching communication from audio call client 114 to web browser client 116 is valid; in such embodiments, contacting subscriber device 102 to facilitate establishment of a real-time media data communication session is carried out in response to a positive determination by network node 104.

Embodiments comprise network node 104, on the basis of the received information, identifying the audio call communication session being conducted between audio call client 114 of user device 106 and subscriber device 102; in such embodiments, the contacting of subscriber device 102 is carried out further on the basis of the identification of the audio call communication session.

Embodiments comprise network node 104, on the basis of the received information, identifying subscriber device 102 and/or a user of subscriber device 102; in such embodiments, the contacting of subscriber device 102 is carried out further on the basis of the identification of subscriber device 102 and/or a user of subscriber device 102.

Embodiments comprise network node 104, in response to the receipt of the information, transmitting to web browser client 116, signaling information for use in establishing the real-time media data communication session between web browser client 116 and subscriber device 102.

In embodiments, the signaling information received by network node 104 comprises one or more of logic and at least one script for execution by the web browser client.

In embodiments, the signaling information received by network node 104 comprises a network address for a gateway node via which media data for the real-time media data communication session is to be transferred.

Embodiments comprise network node 104 facilitating tear-down of the audio call communication session.

In embodiments, at least part of the information received by network node 104 is cryptographically secured. In embodiments, the information received by network node 104 is received via a URL associated with network node 104.

In embodiments, the information received by network node 104 is received via a webpage hosted by network node 104.

In embodiments, the information received by network node 104 is received via a load balancing scheme implemented in relation to network node 104 and one or more other nodes in the network.

In embodiments, the information received by network node 104 comprises a secure token which comprises a cryptographically secure encoding of an identifier for subscriber device 102 and/or a user of subscriber device 102.

In embodiments, the information received by network node 104 comprises a secure token which comprises a cryptographically secure encoding of an identifier for the audio call communication session.

In embodiments, the information received by network node 104 comprises billing information for the audio call communication session.

In embodiments, the information received by network node 104 comprises an expiry date for the received information.

Embodiments comprise network node 104, on the basis of the information received by network node 104, contacting web browser client 116 to facilitate establishment of a real-time media data communication session between web browser client 116 and subscriber device 102.

In some embodiments, facilitating establishment of a real-time media data communication session between web browser client 116 and subscriber device 102 comprises facilitating establishment of a first real-time media data communication session between subscriber device 102 and network node 104 and a second real-time media data communication session between web browser client 116 and network node 104. In other embodiments, facilitating establishment of a real-time media data communication session between web browser client 116 and subscriber device 102 comprises facilitating establishment of a direct real-time media data communication session between subscriber device 102 and web browser client 116.

Embodiments comprise network node 104 performing one or more of transcoding, transrating, resizing and rescaling in relation to media data associated with at least one of the first and second real-time media data communication sessions.

In embodiments, network node 104 contacting subscriber device 102 to facilitate establishment of a real-time media data communication session comprises instructing subscriber device 102 to invoke a communication client on subscriber device 102 which is capable of transferring real-time media data with web browser client 116.

In embodiments, network node 104 contacting subscriber device 102 to facilitate establishment of a real-time media data communication session comprises transmitting a user confirmation request to subscriber device 102 which is operable to instruct subscriber device 102 to request confirmation from the user of subscriber device 102 that the user of subscriber device 102 wishes to switch communication from audio call client 114 of user device 106 to web browser client 116 before instructing subscriber device 102 to invoke the communication client on subscriber device 102 which is capable of transferring real-time media data with web browser client 116.

In embodiments, when an enabled subscriber (i.e. one whose carrier has implemented the function in their network, or whose client has implemented the function) is in a standard voice call with another party (who may or may not have the service), that user is provided with the option on their subscriber device to uplift the current call.

The presentation of the option to the subscriber may take many forms, for example a hard button on the subscriber device, a soft option in the voice application, an option in a call manager, or a tone activated service.

In embodiments, when the option is selected by the subscriber, a URL (or other standard identifier) is generated which encodes one or more of the name/address of one or more hosting network nodes (for example servers) (for a webserver this may for example use a standard IP address, a DNS, and/or a load balancing scheme), a page hosted on that network node (for a webserver this may for example be the normal directory/file part of the URL), and an opaque, cryptographically secure "token", identifying a subscriber identifier plus possibly a call reference, information on the other party, etc.

In embodiments involving a URL, the URL may be passed to the user device of the other, remote party via a suitable mechanism such as email of a URL, automated SMS (or other messaging technique) to the other party's telephone number, verbally, quick-response (QR) code sent by MMS, etc.

In embodiments, the other, remote party follows the provided URL in a suitable media enabled browser (for example one supporting webRTC).

In embodiments, the page served from the hosting network node either directly serves suitable signaling logic/scripts to the calling browsers, which includes the address of a suitable gateway, or the page may redirect to a gateway which serves the logic/scripts directly. In embodiments, the script running in the other party's browser establishes a secure connection to the gateway, over which is presented the token. In embodiments, the network node checks the token, and assuming it proves valid, performs one or more of the following embodiments:

A first embodiment involves sending a notification to the subscriber on the originating subscriber device, which causes a suitable client to be automatically invoked which then does end-to-end signaling of a suitable HD/video call to the other party's browser, swapping over from the normal call, and dropping that once the HD/video session is established.

A second embodiment proceeds according to the first embodiment, but comprises generating a user notification which has to be accepted before the process is completed.

A third embodiment proceeds according to the first embodiment and/or second embodiments, but comprises the notification happening on an alternate device and/or call manager (for example on a personal computer (PC) or in a pre-existing browser window).

A fourth embodiment proceeds according to the first embodiment, but comprises originating a native multimedia and/or HD call on the subscribers network, with a network node/gateway bridging/converting the two signaling protocols. The fourth embodiment may involve the network node directly setting up the multimedia and/or HD call in the context of the issuing subscriber and using originating call service support. In some embodiments, the calling party information contains reference to a token, who it was issued to, the related call, etc.

In embodiments, depending on the capability of the two user devices, in addition to providing the above signaling functionality, a network node/gateway may also provide transcoding/transrating/resizing/rescaling of the media data to allow successful functioning of the call.

In embodiments, depending on carrier policy, an uplifted call may be billed to the original subscriber's account.

Embodiments provide a communication switching (or 'uplift') function to a non-subscriber who has a media capable browser (for example the user of user device 106).

Embodiments comprise generation of URL and/or token allowing a call/session to be made in the context of an existing subscriber and/or call/session.

Embodiments comprise a hosting network node/server/ gateway (for example network node 104) which may be a normal corporate web server or a cloud web server.

Embodiments comprise active script/code to perform signaling from a browser.

Embodiments comprise a network node/server/gateway (for example network node 104) which performs validation of a token, and either invokes an end to end real-time media call/session, or originates a native call/session in the context of the subscriber and joins session 'legs' on either side in a back-to-back manner.

Embodiments comprise use of CGOs for greater control, revocation, constraints, etc.

Embodiments comprise transcode/transrate/resize/rescale functionality in a network node, server or gateway (for example network node 104).

Figure 2:
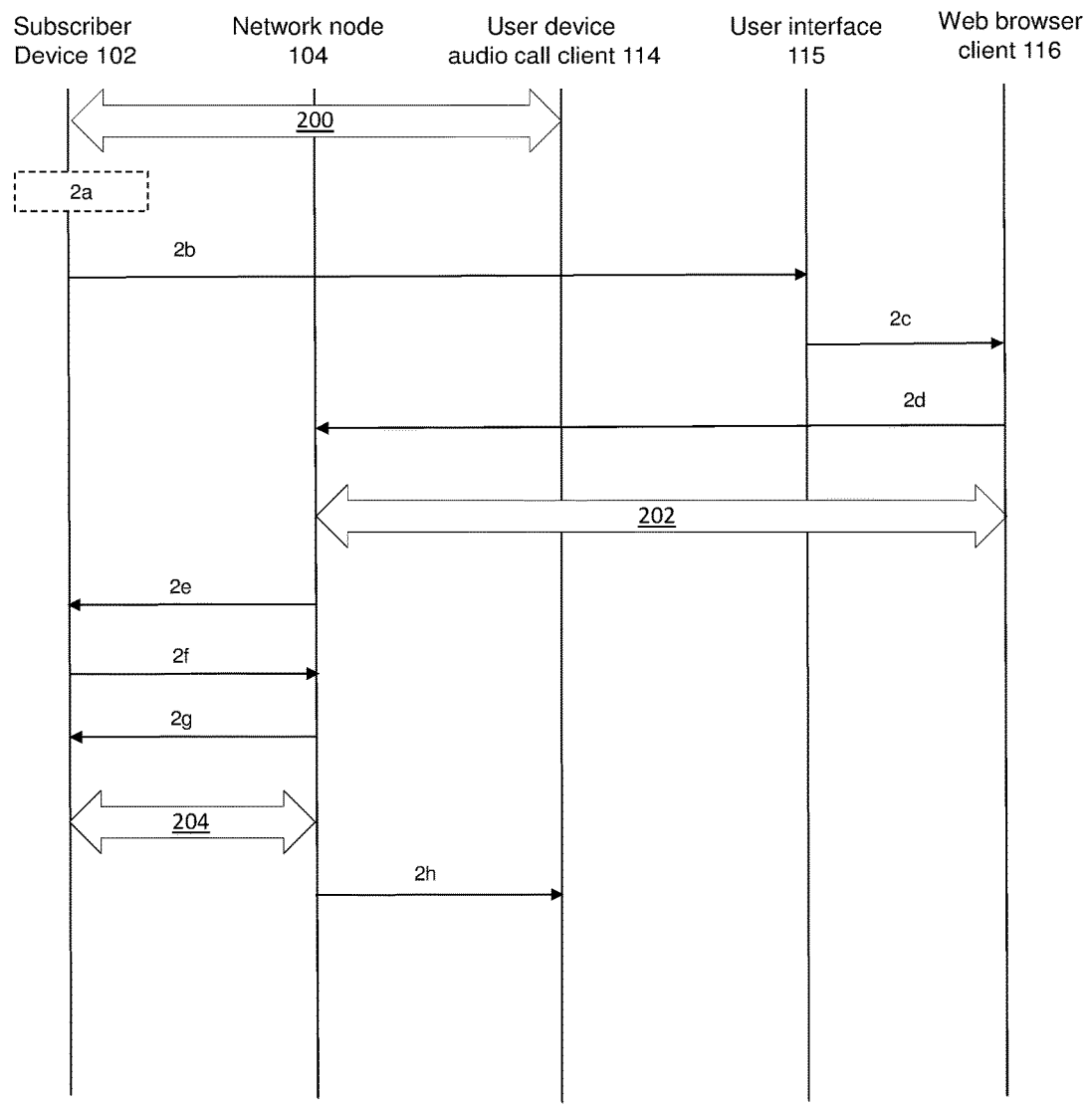
FIG. 2 shows a flow diagram according to embodiments.

FIG. 2 shows a flow diagram according to embodiments. Element 200 indicates that a communication session is being conducted between subscriber device 102 and audio call client 114 of user device 106 which involves the transfer of audio data between subscriber device 102 and the audio call client 114 of user device 114. In these embodiments, subscriber device 102 comprises a user interface (for example a Graphical User Interface (GUI)) which is configured to present an option to the subscriber to switch communication from audio call client 114 of the user device 106 to web browser client 116. In step 2a, user input indicating that the subscriber accepts the communication switch option is received via the user interface of subscriber device 102. Subscriber device 102 then transmits in step 2b, to user interface 115 associated with the user of user device 106, information associated with switching communication from audio call client 114 of user device 106 to web browser client 116, for example in the form of a URL comprised within an SMS message. The transmitted information is passed on to web browser client 116 in step 2c, for example by entering an associated URL into the address field of web browser client 116.

On the basis of the received information, web browser client 116 contacts network node 104 in step 2d to establish a real-time media data communication session between web browser client 116 and subscriber device 102. Step 2d may for example involve a hypertext transfer protocol (HTTP) GET operation or transmittal of a Session Initiation Protocol (SIP) INVITE message.

On the basis of the information received from web browser client 116, network node 104 contacts subscriber device 102 to facilitate establishment of a real-time media data communication session between web browser client 116 and subscriber device 102 in step 2e. In the embodiments depicted in FIG. 2, network node 104 facilitates establishment of a first real-time media data communication session 204 between subscriber device 102 and network node 104 and a second real-time media data communication session 202 between web browser client 116 and network node 104.

In the embodiments of FIG. 2, network node 104 remains in the media path of the real-time media data communication session.

Step 2e may for example comprise network node 104 transmitting a SIP re-INVITE message with updated session description protocol (SDP) data to subscriber device 102. In such embodiments, subscriber device 102 may for example respond in step 2f with a SIP 200 OK message indicating acceptance and then network node 104 may for example transmit a SIP ACK message in acknowledgement in step 2g. In step 2h, network node confirms establishment of a real-time media data communication session between web browser client 116 and subscriber device 102 to audio call client 114, for example in the form of a SIP BYE message.

Figure 3:
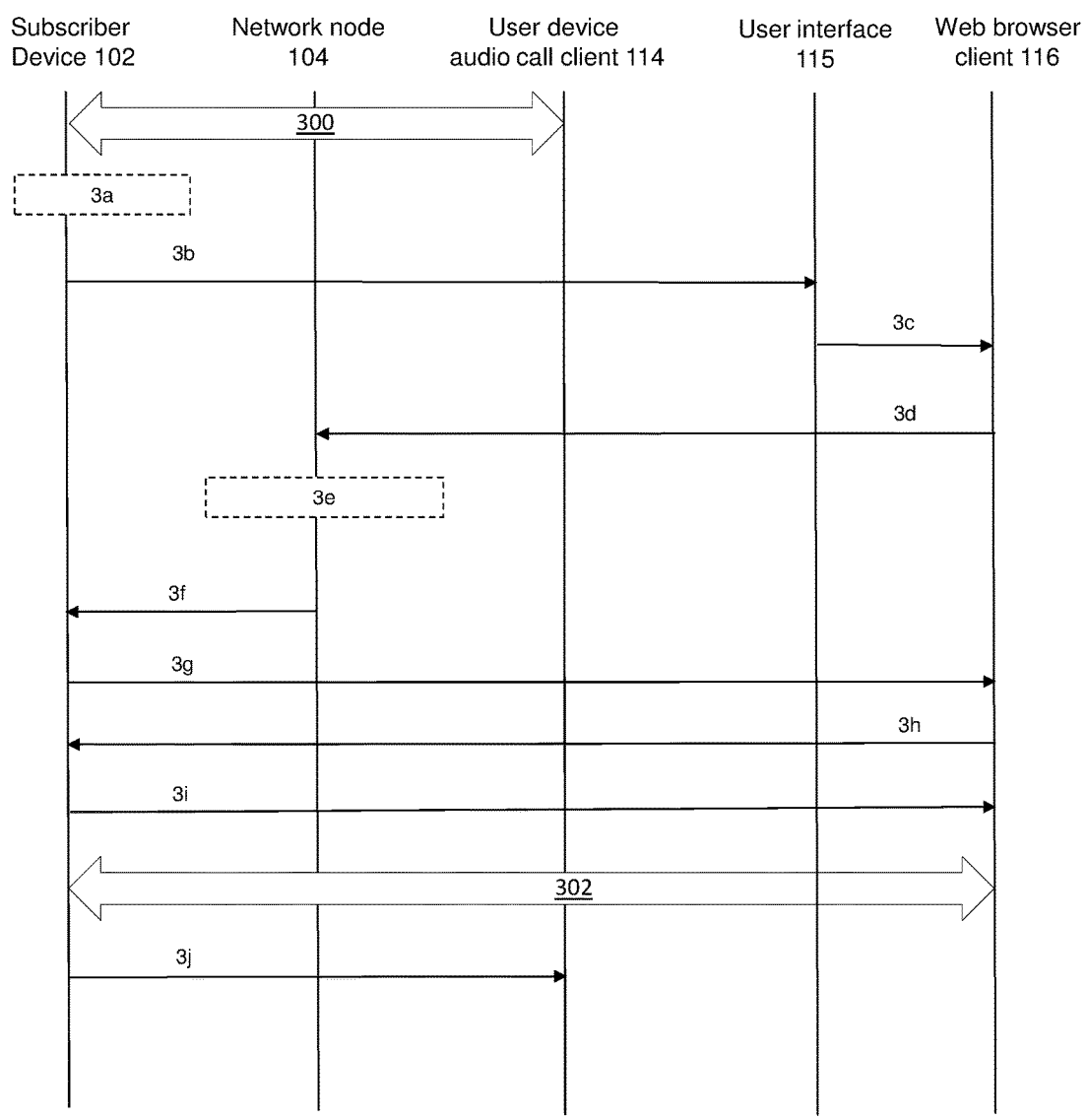
FIG. 3 shows a flow diagram according to embodiments.

FIG. 3 shows a flow diagram according to embodiments. Element 300 and steps 3a, 3b, 3c and 3d correspond to element 200 and steps 2a, 2b, 2c and 2d respectively as described above in relation to FIG. 2.

In response to receipt of the information from web browser client 116, network node 104 performs a validity check on at least a part of the received information to determine whether switching communication from audio call client 114 to web browser client 116 is valid in step 3e. A similar validity check may be performed in relation to the embodiments of FIG. 2.

In response to a positive determination, network node 104 contacts subscriber device 102 on the basis of the information received from web browser client 116 to facilitate establishment of a real-time media data communication session between web browser client 116 and subscriber device 102 in step 3f.

In the embodiments depicted in FIG. 3, network node 104 facilitates establishment of a real-time media data communication session between web browser client 116 and subscriber device 102 by facilitating establishment of a direct real-time media data communication session between the remote subscriber device and the web browser client as denoted by element 302.

In the embodiments of FIG. 3, network node 104 does not remain in the media data path of the real-time media data communication session.

Step 3f may for example comprise transmitting a SIP INFO or SIP NOTIFY message which contains an identifier for the session and an identifier for web browser client 116.

In the embodiments of FIG. 3, establishing the real-time media data communication session comprises subscriber device 102 contacting web browser client 116 in step 3g, for example by transmitting an appropriate SIP INVITE message.

In some such embodiments, web browser client responds in step 3h with a SIP 200 OK message indicating acceptance and then subscriber device 102 may for example transmit a SIP ACK message in acknowledgement in step 3i. In step 3j, subscriber device 102 confirms establishment of a real-time media data communication session between web browser client 116 and subscriber device 102 to audio call client 114, for example in the form of a SIP BYE message.

In alternative embodiments, instead of network node 104 transmitting a SIP INFO or SIP NOTIFY message to subscriber device 102 in step 3f, network node 104 transmits the message to web browser client 116; in such embodiments, the directions of the messages transmitted subsequently in steps 3g, 3h and 3i will be reversed. Such embodiments can help to avoid Network Address Translation (NAT) preventing (or otherwise causing problems with) establishment of a direct media data session between subscriber device 102 and web browser client 116.

Figure 4:
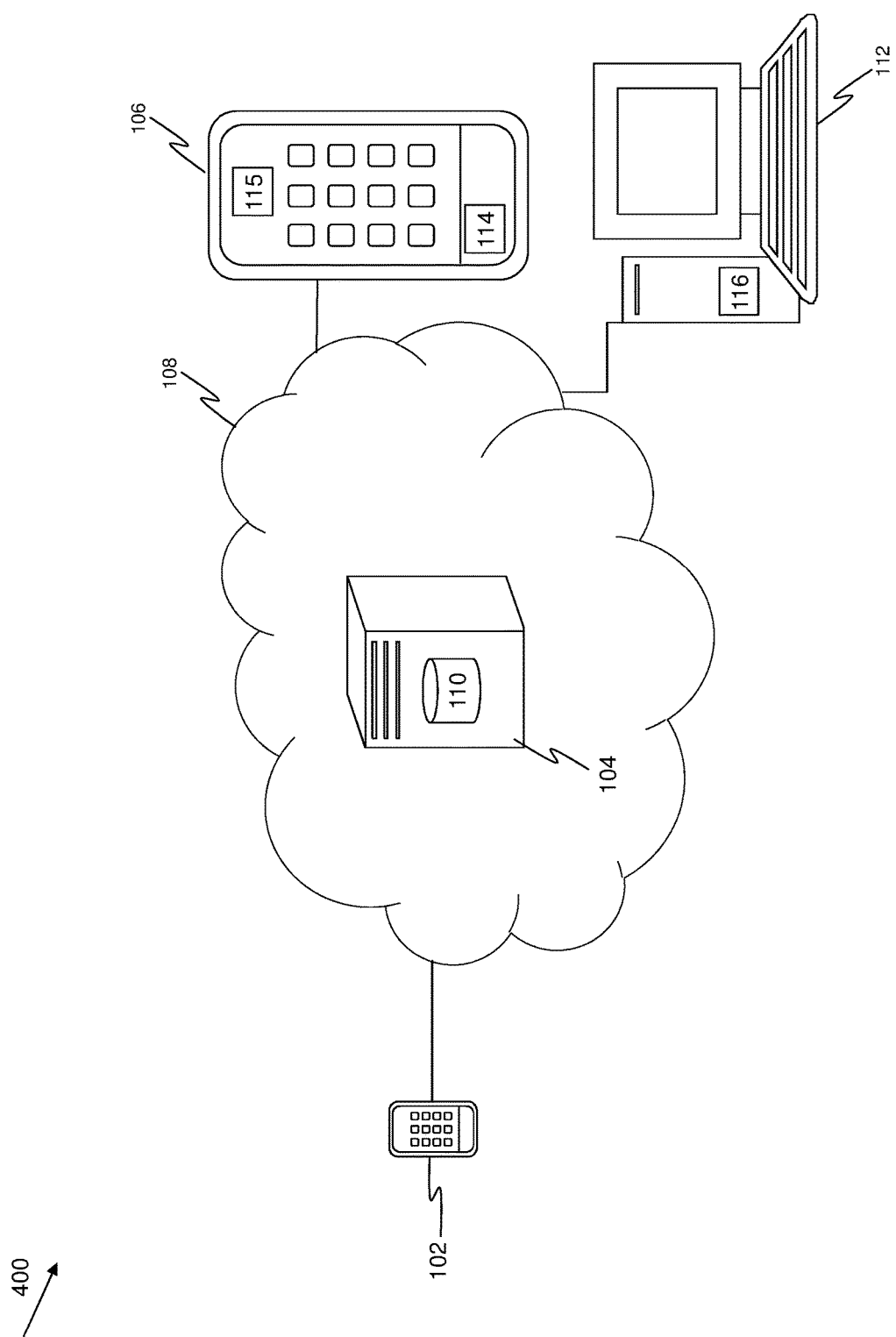
FIG. 4 shows a system diagram according to embodiments.

FIG. 4 shows a system diagram of a network 400 according to embodiments. Network 400 of FIG. 4 comprises a number of similar elements to network 100 of FIG. 1, with similar elements being labelled similarly. Network 400 comprises an additional user device 112 associated with the user of user device 106. In the embodiments of FIG. 4, web browser client 116 is comprised within user device 112 (instead of within user device 106 as in the embodiments of FIG. 1). In embodiments, user device 106 and user device 112 are paired devices associated with a single user. In the embodiments of FIG. 4, user interface 115 is comprised within user device 106.

In some of the embodiments described above, for example as depicted in FIG. 1, audio call client 114 and web browser client 116 are located on the same user device, namely user device 106.

In alternative embodiments, audio call client 114 is located on a different device from web browser client 116. In example such embodiments, as depicted in FIG. 4, audio call client 114 is located on a user device 106 (for example a mobile (or 'cellular')) telephone and web browser client 116 is located on a different user device 112 (for example a PC, tablet or suchlike).

Such embodiments allow a user to switch a communication (or 'uplift') to a communication client or user device which comprises a capability that the current (i.e. being used for an existing audio call) user device or communication client does not have. For example, user device 106 nay not have a video capability, whereas user device 112 does have a video capability.

Such embodiments allow a user to switch a communication to a communication client or user device which comprises an enhanced (or 'advanced') capability compared to a capability of the current user device or communication client. For example, user device 106 may only have a relatively low-definition audio capability, whereas user device 112 has a relatively high-definition audio capability. For example user device 106 may only have a relatively small display screen for displaying video data, whereas user device 112 has a relatively large display screen for displaying video data.

Figure 5:
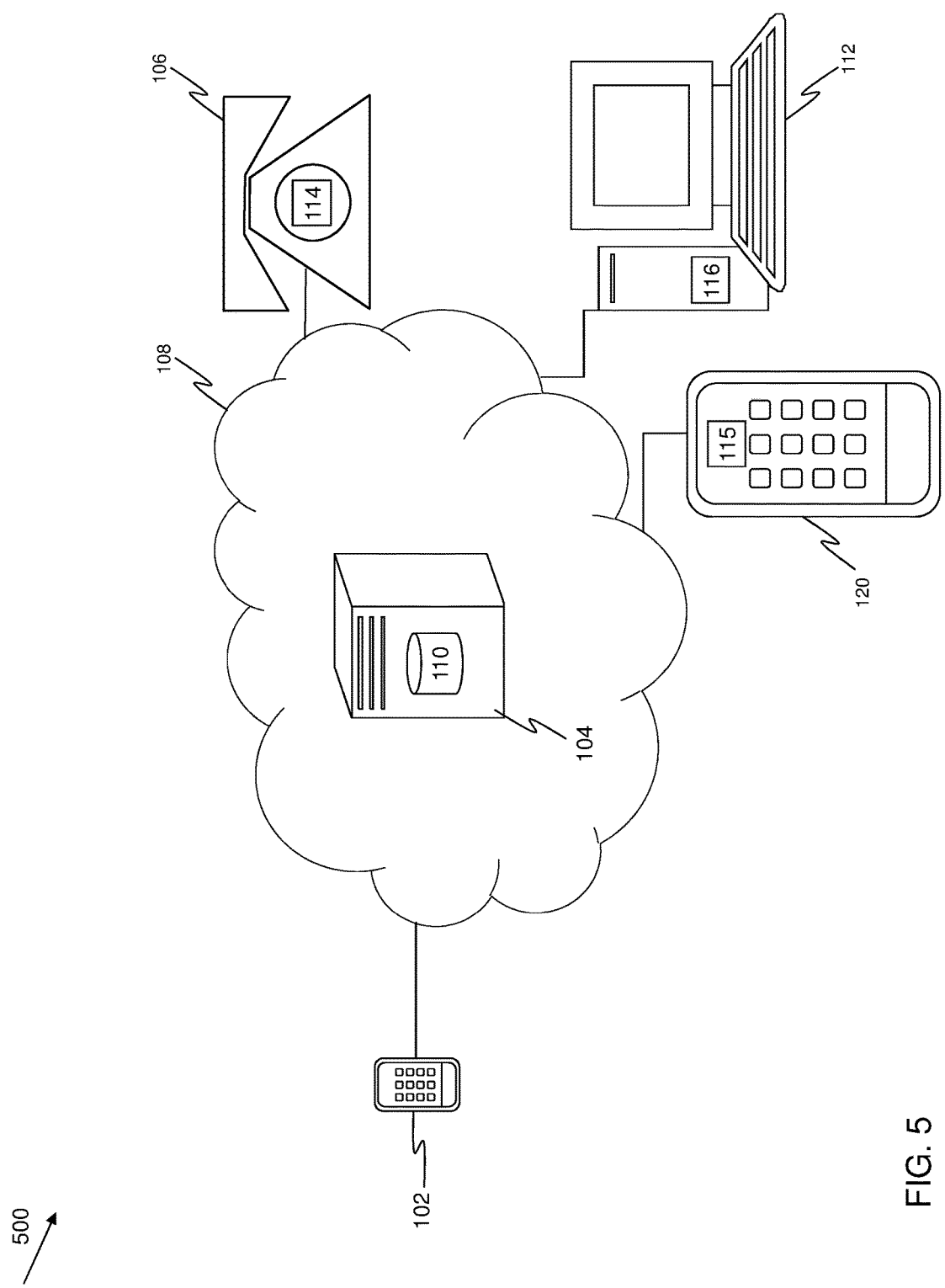
FIG. 5 shows a system diagram according to embodiments.

FIG. 5 shows a system diagram of a network 500 according to embodiments. Network 500 of FIG. 5 comprises a number of similar elements to network 100 of FIG. 1 and network 400 of FIG. 4, with similar elements being labelled similarly. Network 500 comprises an additional user device 120 associated with the user of user device 106 and user device 112. In the embodiments of FIG. 5, user interface 115 is comprised within user device 120 (instead of within user device 106 as in the embodiments of FIG. 1 and FIG. 4). In embodiments, user device 106, user device 112 and user device 120 are paired devices associated with a single user. In the embodiments of FIG. 5, user device 106 may for example comprise an analogue (or 'POTS', or 'dumb' or 'black') phone with a relatively limited user interface capability, whereas user device 120 may for example comprise a smartphone or tablet with a relatively more advanced user interface capability.

In embodiments, user interface 115 associated with the user of user device 106 is comprised in user device 106.

In embodiments, user interface 115 associated with the user of user device 106 is comprised in a different device (for example user device 120) from user device 106.

In embodiments, user interface 115 associated with the user of user device 106 is comprised in the same device as web browser client 116.

In embodiments, user interface 115 associated with the user of user device 106 is comprised in a different device from web browser client 116.

One or more of the aspects of the embodiments described herein with reference to the drawings comprise processes performed by one or more user devices and/or one or more network nodes. In embodiments, the one or more user devices and/or one or more network nodes comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples. Further embodiments are envisaged.

Embodiments described above involve issuance of URLs and/or tokens in relation to one or more existing communication sessions/calls. In alternative embodiments, URLs and/or tokens are issued outside the scope of a given session/call, providing whoever receives the URL/token with the ability to call the issuing party from a browser (or similarly enabled device). Embodiments therefore provide the ability to call a third party, with billing to the issuing subscriber, with a wide range of possible restrictions and/or limitations, either directly encoded in the URL/token, or in an associated CGO.

In embodiments, one or more of the functions of network node 104 are carried out by two or more different functional elements and/or physical entities.

For example, one or more elements/entities may comprise a hosting web server for transmittal of a URL.

For example, one or more elements/entities may comprise a web server function on a gateway node.

For example, one or more elements/entities may comprise logic on a gateway node to perform token validation/forwarding of signaling.

For example, one or more elements/entities may comprise a transcode/transrate/transsize function.

For example, one or more elements/entities may comprise a SIP signaling network located between the gateway and the subscriber device.

The following numbered clauses set out various embodiments of the present disclosure 42. A method of operating a user device in a network, the user device comprising an audio call client, the method comprising:

conducting an audio call communication session between the audio call client of the user device and a remote subscriber device, the audio call communication session comprising the transfer of audio data between the audio call client and the remote subscriber device;

during the audio call communication session, receiving, at a user interface associated with a user of the user device, information associated with switching communication from the audio call client to a web browser client;

on the basis of the received information, contacting a network node to establish a real-time media data communication session between the web browser client and the remote subscriber device; and transferring real-time media data between the web browser client and the remote subscriber device instead of audio data between the audio call client and the remote subscriber device.

43. A method according to clause 42, wherein the web browser client is located on the user device.

44. A method according to clause 42, wherein the web browser client is located on a different device from the user device.

45. A method according to any of clauses 42 to 44, comprising, in response to the contacting, receiving, at the web browser client, signaling information for use in establishing the real-time media data communication session between the web browser client and the remote subscriber device.

46. A method according to clause 45, wherein the received signaling information comprises one or more of logic and at least one script for execution by the web browser client.

47. A method according to clause 45 or 46, wherein the received signaling information comprises a network address for a gateway node via which media data for the real-time media data communication session is to be transferred.

48. A method according to clause 47, where the gateway node comprises the network node.

49. A method according to clause 47, where the gateway node comprises a different node from the network node.

50. A method according to any of clauses 47 to 49, wherein contacting the network node comprises contacting the network address of the gateway comprised in the received signaling information.

51. A method according to any of clauses 42 to 50, comprising tearing down the audio call communication session.

52. A method according to clause 51, comprising receiving confirmation that a real-time media data communication session has been established between the web browser client and the remote subscriber device, wherein the tearing down of the audio call communication session is carried out in response to receipt of the confirmation.

53. A method according to any of clauses 42 to 52, wherein the received information comprises one or more of a network address and a host name for the network node.

54. A method according to any of clauses 42 to 53, wherein the received information is encoded within a Uniform Resource Locator (URL).

55. A method according to any of clauses 42 to 54, wherein at least part of the received information is cryptographically secured.

56. A method according to any of clauses 42 to 5, wherein contacting the network node comprises navigating to a URL associated with the network node.

57. A method according to any of clauses 42 to 56, wherein contacting the network node comprises navigating to a webpage hosted by the network node.

58. A method according to any of clauses 42 to 57, wherein contacting the network node comprises performing a lookup of a hostname of the network node to obtain a network address for the network node.

59. A method according to any of clauses 42 to 58, wherein contacting the network node comprises identifying the network node via a load balancing scheme implemented in relation to the network node and one or more other nodes in the network.

60. A method according to any of clauses 42 to 59, wherein contacting the network node comprises providing a secure token which comprises a cryptographically secure encoding of an identifier for the remote subscriber device and/or a user of the remote subscriber device.

61. A method according to any of clauses 42 to 60, wherein contacting the network node comprises providing a secure token which comprises a cryptographically secure encoding of an identifier for the audio call communication session.

62. A method according to any of clauses 42 to 61, wherein the received information comprises billing information for the audio call communication session.

63. A method according to any of clauses 42 to 62, wherein the received information comprises an expiry date for the received information.

64. A method according to any of clauses 42 to 63, wherein the web browser client comprises a browser-based real-time media communication capability and the media data is transferred via the browser-based real-time media communication capability.

65. A method according to clause 64, wherein the browser-based real-time media communication capability comprises web real-time communication (webRTC).

66. A method according to any of clauses 42 to 65, wherein the transferred real-time media data comprises one or more of:
video data, and
audio data in an enhanced format compared to the audio data received via the audio call client.

67. A method according to any of clauses 42 to 66, wherein the received information is received from the remote subscriber device.

68. A method according to any of clauses 42 to 66, wherein the received information is received from the remote subscriber device via one or more intermediate network nodes 69. A method according to any of clauses 42 to 66, wherein the received information is received from the network node.

70. A method according to clause 47 and any of clauses 42 to 66, wherein the received information is received from the gateway node.

71. A method according to any of clauses 42 to 66, wherein receiving the information comprises receiving a reference to a subscriber profile for the user of the remote subscriber device stored at a service provider node and using the received reference to download the information from the service provider node.

72. A method according to any of clauses 42 to 71, wherein the received information is received via one or more of the following:
email,
text message,
instant message, and
multimedia message.

73. A method according to according to any of clauses 42 to 72, wherein the user interface associated with the user of the user device comprises a capability to interface with one or more of the following:
- an email client,
- a text messaging client,
- an instant messaging, and
- a multimedia messaging client.

74. A method according to any of clauses 42 to 73, wherein the audio call client of the user device does not support real-time transfer of media data.

75. A method according to any of clauses 42 to 74, wherein the user interface associated with the user of the user device is comprised in the user device.

76. A method according to any of clauses 42 to 74, wherein the user interface associated with the user of the user device is comprised in a different device from the user device.

77. A method according to any of clauses 42 to 76, wherein the user interface associated with the user of the user device is comprised in the same device as the web browser client.

78. A method according to any of clauses 42 to 76, wherein the user interface associated with the user of the user device is comprised in a different device from the web browser client.

79. Apparatus for use in operating a user device in a network, the user device comprising an audio call client, the apparatus being configured to:
conduct an audio call communication session between the audio call client of the user device and a remote subscriber device, the audio call communication session comprising the transfer of audio data between the audio call client and the remote subscriber device;
during the audio call communication session, receive, at a user interface associated with a user of the user device, information associated with switching communication from the audio call client to a web browser client;
on the basis of the received information, contact a network node to establish a real-time media data communication session between the web browser client and the remote subscriber device; and
transfer real-time media data between the web browser client and the remote subscriber device instead of audio data between the audio call client and the remote subscriber device.

80. A computer program comprising a set of instructions, which, when executed by a computerized device, cause the computerized device to perform a method of operating a user device in a network, the user device comprising an audio call client, the method comprising:
conducting an audio call communication session between the audio call client of the user device and a remote subscriber device, the audio call communication session comprising the transfer of audio data between the audio call client and the remote subscriber device;
during the audio call communication session, receiving, at a user interface associated with a user of the user device, information associated with switching communication from the audio call client to a web browser client;
on the basis of the received information, contacting a network node to establish a real-time media data communication session between the web browser client and the remote subscriber device; and
transferring real-time media data between the web browser client and the remote subscriber device instead of audio data between the audio call client and the remote subscriber device.

81. A method of operating a network node in a network, the method comprising, at the network node:
during an audio call communication session being conducted between an audio call client of a user device and a remote subscriber device, the audio call communication session comprising the transfer of audio data between the audio call client of the user device and the remote subscriber device, receiving, from a web browser client, information associated with switching communication from the audio call client to the web browser client; and
on the basis of the received information, contacting the remote subscriber device to facilitate establishment of a real-time media data communication session between the web browser client and the remote subscriber device,
whereby real-time media data is transferred between the web browser client and the remote subscriber device instead of audio data between the audio call client of the user device and the remote subscriber device.

82. A method according to clause 81, wherein the web browser client is located on the user device.

83. A method according to clause 91, wherein the web browser client is located on a different device from the user device.

84. A method according to any of clauses 81 to 83, comprising, in response to receipt of the information, performing a validity check on at least a part of the received information to determine whether switching communication from the audio call client to the web browser client is valid, wherein contacting the remote subscriber device to facilitate establishment of a real-time media data communication session is carried out in response to a positive determination.

85. A method according to any of clauses 81 to 84, wherein the information is received from the web browser client.

86. A method according to any of clauses 81 to 85, comprising, on the basis of the received information, identifying the audio call communication session being conducted between the audio call client of the user device and the remote subscriber device,
wherein contacting the remote subscriber device is carried out further on the basis of the identification of the audio call communication session.

87. A method according to any of clauses 81 to 86, comprising, on the basis of the received information, identifying the remote subscriber device and/or a user of the remote subscriber device,
wherein contacting the remote subscriber device is carried out further on the basis of the identification of the remote subscriber device and/or a user of the remote subscriber device.

88. A method according to any of clauses 81 to 87, comprising, in response to the receipt of the information, transmitting to the web browser client, signaling information for use in establishing the real-time media data communication session between the web browser client and the remote subscriber device.

89. A method according to clause 88, wherein the received signaling information comprises one or more of logic and at least one script for execution by the web browser client.

90. A method according to clause 88 or 89, wherein the received signaling information comprises a network address for a gateway node via which media data for the real-time media data communication session is to be transferred.

91. A method according to any of clauses 81 to 90, comprising facilitating tear-down of the audio call communication session.

92. A method according to any of clauses 81 to 91, wherein at least part of the received information is cryptographically secured.

93. A method according to any of clauses 81 to 92, wherein the information is received via a URL associated with the network node.

94. A method according to any of clauses 81 to 93, wherein the information is received via a webpage hosted by the network node.

95. A method according to any of clauses 81 to 94, wherein the information is received via a load balancing scheme implemented in relation to the network node and one or more other nodes in the network.

96. A method according to any of clauses 81 to 95, wherein the received information comprises a secure token which comprises a cryptographically secure encoding of an identifier for the remote subscriber device and/or a user of the remote subscriber device.

97. A method according to any of clauses 81 to 96, wherein the received information comprises a secure token which comprises a cryptographically secure encoding of an identifier for the audio call communication session.

98. A method according to any of clauses 81 to 97, wherein the received information comprises billing information for the audio call communication session.

99. A method according to any of clauses 81 to 98, wherein the received information comprises an expiry date for the received information.

100. A method according to any of clauses 81 to 99, comprising, on the basis of the received information, contacting the web browser client to facilitate establishment of a real-time media data communication session between the web browser client and the remote subscriber device.

101. A method according to clause 100, wherein facilitating establishment of a real-time media data communication session between the web browser client and the remote subscriber device, comprises facilitating establishment of a first real-time media data communication session between the remote subscriber device and the network node and a second real-time media data communication session between the web browser client and the network node.

102. A method according to clause 101, comprising performing one or more of the following in relation to media data associated with at least one of the first and second real-time media data communication sessions:
transcoding,
transrating,
resizing, and
rescaling.

103. A method according to clause 100, wherein facilitating establishment of a real-time media data communication session between the web browser client and the remote subscriber device, comprises facilitating establishment of a direct real-time media data communication session between the remote subscriber device and the web browser client.

104. A method according to any of clauses 81 to 103, wherein the web browser client comprises a browser-based real-time media communication capability and the media data is transferred via the browser-based real-time media communication capability.

105. A method according to clause 104, wherein the browser-based real-time media communication capability comprises web real-time communication (webRTC).

106. A method according to any of clauses 81 to 105, wherein the transferred real-time media data comprises one or more of:
video data, and
audio data in an enhanced format compared to the audio data transferred via the audio call client.

107. A method according to any of clauses 81 to 106, wherein contacting the remote subscriber device to facilitate establishment of a real-time media data communication session comprises instructing the remote subscriber device to invoke a communication client on the remote subscriber device which is capable of transferring real-time media data with the web browser client.

108. A method according to clause 107, wherein contacting the remote subscriber device to facilitate establishment of a real-time media data communication session comprises transmitting a user confirmation request to the remote subscriber device which is operable to instruct the remote subscriber device to request confirmation from the user of the remote subscriber device that the user of the remote subscriber device wishes to switch communication from the audio call client of the user device to the web browser client before instructing the remote subscriber device to invoke the communication client on the remote subscriber device which is capable of transferring real-time media data with the web browser client.

109. A method according to any of clauses 81 to 108, wherein the audio call client of the user device does not support real-time transfer of media data.

110. Apparatus for use in operating a network node in a network, the apparatus being configured to, at the network node:
during an audio call communication session being conducted between an audio call client of a user device and a remote subscriber device, the audio call communication session comprising the transfer of audio data between the audio call client of the user device and the remote subscriber device, receive, from a web browser client, information associated with switching communication from the audio call client to the web browser client; and
on the basis of the received information, contact the remote subscriber device to facilitate establishment of a real-time media data communication session between the web browser client and the remote subscriber device,
whereby real-time media data is transferred between the web browser client and the remote subscriber device instead of audio data between the audio call client of the user device and the remote subscriber device.

111. A computer program comprising a set of instructions, which, when executed by a computerized device, cause the computerized device to perform a method of operating a network node in a network, the method comprising, at the network node:
during an audio call communication session being conducted between an audio call client of a user device and a remote subscriber device, the audio call communication session comprising the transfer of audio data between the audio call client of the user device and the remote subscriber device, receiving, from a web browser client, information associated with switching communication from the audio call client to the web browser client; and
on the basis of the received information, contacting the remote subscriber device to facilitate establishment of a real-time media data communication session between the web browser client and the remote subscriber device,
whereby real-time media data is transferred between the web browser client and the remote subscriber device instead of audio data between the audio call client of the user device and the remote subscriber device.

112. A system configured to:
conduct an audio call communication session between a subscriber device and an audio call client of a remote user device, the audio call communication session comprising the transfer of audio data between the subscriber device and the audio call client of the remote user device;
at the subscriber device, during the audio call communication session, cause transmittal, to a user interface associated with a user of the remote user device, of information associated with switching communication from the audio call client of the remote user device to a web browser client;
at the user interface associated with the user of the remote user device, receive the information associated with switching communication from the audio call client to the web browser client;
at the web browser client, on the basis of the received information, contact a network node to establish a real-time media data communication session between the web browser client and the subscriber device;
at the network node, on the basis of the contact from the web browser client, contact the subscriber device to facilitate establishment of a real-time media data communication session between the web browser client and the subscriber device; and
conduct a real-time media data communication session between the web browser client and the subscriber device comprising real-time transfer of media data between the web browser client and the subscriber device instead of audio data between the audio call client of the user device and the subscriber device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of operating a subscriber device in a network, the method comprising:
    conducting an audio call communication session between the subscriber device and an audio call client of a remote user device, the audio call communication session comprising the transfer of audio data between the subscriber device and the audio call client of the remote user device;
    during the audio call communication session, causing transmittal, to a user interface associated with a user of the remote user device, of information associated with switching communication from the audio call client of the remote user device to a web browser client;
    in response to the transmittal, establishing a real-time media data communication session between the subscriber device and the web browser client; and
    transferring real-time media data between the subscriber device and the web browser client instead of audio data between the subscriber device and the audio call client of the remote user device.

2. The method of claim 1, wherein the web browser client is located on the remote user device.

3. The method of claim 1, wherein the web browser client is located on a different device from the remote user device.

4. The method of claim 1, wherein the transmitted information comprises signalling information for use in establishing the real-time media data communication session between the subscriber device and the web browser client.

5. The method of claim 1, comprising tearing down the audio call communication session.

6. The method of claim 1, wherein the transmitted information is encoded within a Uniform Resource Locator (URL).

7. The method of claim 1, wherein the transmitted information comprises one or more of:
    a network address for a network node via which establishment of the real-time media data communication session between the subscriber device and the web browser client is to be facilitated, and
    a host name for a network node via which establishment of the real-time media data communication session between the subscriber device and the web browser client is to be facilitated.

8. The method of claim 1, wherein at least part of the transmitted information is cryptographically secured.

9. The method of claim 1, wherein the transmitted information comprises one or more of:
    a secure token which comprises a cryptographically secure encoding of an identifier for the subscriber device and/or a user of the subscriber device,
    a secure token which comprises a cryptographically secure encoding of an identifier for the audio call communication session,
    billing information for the audio call communication session, and
    an expiry date for the transmitted information.

10. The method of claim 1, wherein the web browser client comprises a browser-based real-time media communication capability and the media data is transferred via the browser-based real-time media communication capability.

11. The method of claim 1, wherein the transferred real-time media data comprises one or more of:
    video data, and
    audio data in an enhanced format compared to the audio data transferred via the audio call client.

12. The method of claim 1, wherein causing the transmittal of the information comprises:
    generating the information at the subscriber device and transmitting the information from the subscriber device to the user interface associated with the user of the remote user device, or
    instructing a network node to generate the information and transmit the generated information from the instructed network node to the user interface associated with the user of the remote user device.

13. The method of claim 1, wherein causing the transmittal of the information comprises causing the subscriber device to:
    follow a reference to a subscriber profile for a user of the subscriber device stored at a service provider node;
    retrieve the information from the subscriber profile; and
    transmit the information to the user interface associated with the user of the remote user device, or
    causing the subscriber device to provide, to the user interface associated with the user of the remote user device, a reference to a subscriber profile for the user of the subscriber device stored at a service provider node, whereby the user interface associated with the user of the remote user device uses the reference to the subscriber profile to cause the service provider node to transmit the information to the user interface associated with the user of the remote user device.

14. The method of claim 1, wherein the subscriber device comprises a user interface and the method comprises:
   configuring the user interface of the subscriber device to present an option to the subscriber to switch communication from the audio call client of the remote user device to the web browser client; and
   in response to the configuring, receiving, via the user interface of the subscriber device, user input indicating that the subscriber accepts the communication switch option,
   wherein the real-time media data communication session is established between the subscriber device and the web browser client in response to receipt of the user input.

15. The method of claim 1, comprising receiving, from a network node via which establishment of the real-time media data communication session between the subscriber device and the web browser client is to be facilitated, an instruction to invoke a communication client on the subscriber device which is capable of transferring real-time media data with the web browser client,
   wherein the real-time media data is transferred between the capable communication client of the subscriber device and the web browser client.

16. The method of claim 1, wherein the real-time media data communication session established between the web browser client and the remote user device comprises:
   a first real-time media data communication session between the remote user device and a network node via which establishment of the real-time media data communication session between the subscriber device and the web browser client is to be facilitated, and a second real-time media data communication session between the web browser client and the network node, or
   a direct real-time media data communication session between the remote user device and the web browser client.

17. The method of claim 1, wherein the audio call client of the remote user device does not support real-time transfer of media data.

18. The method of claim 1, wherein the user interface associated with the user of the remote user device is comprised in the remote user device, or
   wherein the user interface associated with the user of the remote user device is comprised in a different device from the remote user device, and/or
   wherein the user interface associated with the user of the remote user device is comprised in the same device as the web browser client, or
   wherein the user interface associated with the user of the remote user device is comprised in a different device from the web browser client.

19. A system for use in operating a subscriber device in a network, the system comprising at least one memory including computer program code; and
   at least one processor in data communication with the at least one memory, wherein the at least one processor is configured to:
   conduct an audio call communication session between the subscriber device and an audio call client of a remote user device, the audio call communication session comprising the transfer of audio data between the subscriber device and the audio call client of the remote user device;
   during the audio call communication session, cause transmittal, to a user interface associated with a user of the remote user device, of information associated with switching communication from the audio call client of the remote user device to a web browser client;
   in response to the transmittal, establish a real-time media data communication session between the subscriber device and the web browser client; and
   transfer real-time media data between the subscriber device and the web browser client instead of audio data between the subscriber device and the audio call client of the remote user device.

20. A non-transitory computer-readable storage medium comprising computer-executable instructions which, when executed by a processor, cause a computing device to perform a method of operating a subscriber device in a network, the method comprising:
   conducting an audio call communication session between the subscriber device and an audio call client of a remote user device, the audio call communication session comprising the transfer of audio data between the subscriber device and the audio call client of the remote user device;
   during the audio call communication session, causing transmittal, to a user interface associated with a user of the remote user device, of information associated with switching communication from the audio call client of the remote user device to a web browser client;
   in response to the transmittal, establishing a real-time media data communication session between the subscriber device and the web browser client; and
   transferring real-time media data between the subscriber device and the web browser client instead of audio data between the subscriber device and the audio call client of the remote user device.

* * * * *